(12) United States Patent
Gao et al.

(10) Patent No.: US 11,265,062 B2
(45) Date of Patent: Mar. 1, 2022

(54) SOUNDING REFERENCE SIGNAL TRANSMISSION METHOD, TERMINAL DEVICE, AND COMPUTER-READABLE STORAGE MEDIUM

(71) Applicant: HUAWEI TECHNOLOGIES CO., LTD., Guangdong (CN)

(72) Inventors: Xiang Gao, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,139

(22) Filed: Oct. 2, 2020

(65) Prior Publication Data
US 2021/0021319 A1   Jan. 21, 2021

Related U.S. Application Data

(63) Continuation of application No. PCT/CN2018/081804, filed on Apr. 4, 2018.

(51) Int. Cl.
*H04B 7/06* (2006.01)
*H04L 5/00* (2006.01)

(52) U.S. Cl.
CPC ......... *H04B 7/0691* (2013.01); *H04L 5/0012* (2013.01); *H04L 5/0023* (2013.01); *H04L 5/0048* (2013.01)

(58) Field of Classification Search
CPC .. H04B 7/0473; H04B 7/0604; H04B 7/0691; H04L 5/0012; H04L 5/0023; H04L 5/0048
See application file for complete search history.

(56) References Cited

U.S. PATENT DOCUMENTS

| 8,824,584 B2 | 9/2014 | Kim et al. |
| 2010/0215114 A1 | 8/2010 | Kim et al. |

(Continued)

FOREIGN PATENT DOCUMENTS

| CN | 102265648 A | 11/2011 |
| CN | 102355293 A | 2/2012 |

(Continued)

OTHER PUBLICATIONS

3GPP TS 36.211 V15.1.0 (Mar. 2018), 3rd Generation Partnership Project; Technical Specification Group Radio Access Network;Evolved Universal Terrestrial Radio Access (E-UTRA);Physical channels and modulation(Release 15), total 222 pages.

(Continued)

*Primary Examiner* — David B Lugo
(74) *Attorney, Agent, or Firm* — Fish & Richardson P.C.

(57) ABSTRACT

This application provides sounding reference signal transmission methods and apparatuses. One method comprises: determining, by a terminal device, that a sounding reference signal (SRS) to be transmitted is an $n_{SRS}^{th}$ transmission of a plurality of SRS transmissions, wherein $n_{SRS}$ is a non-negative integer; selecting, by a terminal device, an antenna group of Λ antenna groups to transmit the sounding reference signal (SRS) based on Λ and $n_{SRS}$, such that when sending the SRS for 2Λ times, the SRS is sent through each of the Λ antenna groups at least once, wherein Λ is a positive integer greater than or equal to 3; and sending, by the terminal device during the $n_{SRS}^{th}$ transmission, the SRS through antenna ports comprised in the selected antenna group.

12 Claims, 25 Drawing Sheets

110
A terminal device selects, based on a sequence number $n_{SRS}$ of a quantity of transmissions of a sounding reference signal SRS and a quantity Λ of antenna groups, an antenna group whose sequence number is $a(n_{SRS})$ from the Λ antenna groups 120
During the $n_{SRS}^{th}$ SRS transmission, the terminal device sends the SRS through antenna ports included in the antenna group whose sequence number is $a(n_{SRS})$

(56) References Cited

U.S. PATENT DOCUMENTS

2019/0253214 A1\* 8/2019 Liu ................... H04B 7/0413
2021/0083825 A1\* 3/2021 Choi .................... H04L 1/06

FOREIGN PATENT DOCUMENTS

| CN | 103905104 A | 7/2014 |
|---|---|---|
| CN | 106559277 A | 4/2017 |
| EP | 2297980 A1 | 3/2011 |
| WO | 2010082756 A2 | 7/2010 |

OTHER PUBLICATIONS

3GPP TS 36.213 V15.1.0 (Mar. 2018), 3rd Generation Partnership Project; Technical Specification Group Radio Access Network; Evolved Universal Terrestrial Radio Access (E-UTRA); Physical layer procedures (Release 15), Mar. 2018, 501 pages.

Huawei et al., "SRS antenna switching," 3GPP TSG RAN WG1 Meeting #90bis, R1-1718246, Prague, Czech Republic, Oct. 9-13, 2017, 7 pages.

Huawei et al., "Introduction of SRS antenna switching for 4 ports in TS36.213," 3GPP TSG RAN WG1 Meeting #92, R1-1802791, Athens, Greece, Feb. 26-Mar. 2, 2018, 3 pages.

Huawei et al., "On SRS antenna switching for 4 transmission ports," 3GPP TSG RAN WG1 Meeting #92, R1-1801871, Athens, Greece, Feb. 26-Mar. 2, 2018, 5 pages.

PCT International Search Report and Written Opinion issued in International Application No. PCT/CN2018/081804 dated Jan. 7, 2019, 19 pages (with English translation).

Qualcomm Incorporated, "SRS antenna switching for 1T4R and 2T4R," 3GPP TSG RAN WG1 Meeting #92, R1-1802983, Athens, Greece, Feb. 26-Mar. 2, 2018, 8 pages.

Office Action in Chinese Application No. 201880091566.6, dated May 6, 2021, 10 pages.

Extended European Search Report in European Application No. 18913470.3, dated Jan. 12, 2021, 9 pages.

\* cited by examiner

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 |
|---|---|---|---|---|---|---|---|---|---|---|
| 0 | Antenna group 0 | | | | | | | | | |
| 1 | | | | | | Antenna group 1 | | | | |
| 2 | | | Antenna group 2 | | | | | | | |
| 3 | | | | | | | | Antenna group 0 | | |
| 4 | | | | | Antenna group 1 | | | | | |
| 5 | | | | | | | | | | Antenna group 2 |
| 6 | | Antenna group 0 | | | | | | | | |
| 7 | | | | | | | Antenna group 1 | | | |

FIG. 2A

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 |
|---|---|---|---|---|---|---|---|---|---|---|
| 8 | | | | Antenna group 2 | | | | | | |
| 9 | Antenna group 1 | | | | | | | | | |
| 10 | | | Antenna group 0 | | | | | | | |
| 11 | | | | | | Antenna group 2 | | | | |
| 12 | | | | | Antenna group 2 | | | | | |
| 13 | | | | | | | | Antenna group 1 | | |
| 14 | | | | | | | | | Antenna group 0 | |
| 15 | | | | | | | | | | Antenna group 0 |

FIG. 2B

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 |
|---|---|---|---|---|---|---|---|---|---|---|
| 16 |  | Antenna group 1 |  |  |  |  |  |  |  |  |
| 17 |  |  |  |  |  |  | Antenna group 2 |  |  |  |
| 18 |  |  |  | Antenna group 0 |  |  |  |  |  |  |
| 19 |  |  |  |  |  |  |  |  |  | Antenna group 1 |
| 20 | Antenna group 2 |  |  |  |  | Antenna group 0 |  |  |  |  |
| 21 |  |  | Antenna group 1 |  |  |  |  |  |  |  |
| 22 |  |  |  |  |  |  |  |  |  |  |
| 23 |  |  |  |  |  |  |  | Antenna group 2 |  |  |

FIG. 2C

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 |
|---|---|---|---|---|---|---|---|---|---|---|
| 24 | | | | | | | | | | |
| 25 | | | | | | | | | | Antenna group 1 |
| 26 | | Antenna group 2 | | | | | | | | |
| 27 | | | | Antenna group 1 | | | | | | |
| 28 | | | | | | | Antenna group 0 | | | |
| 29 | | | | | | | | | Antenna group 2 | |

FIG. 2D

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 0 | Antenna group 0 | | | | | | | | | | | |
| 1 | | | | | Antenna group 1 | | | | | | | |
| 2 | | | | | | | | | Antenna group 2 | | | |
| 3 | | | Antenna group 1 | | | | | | | | | |
| 4 | | | | | | | Antenna group 2 | | | | | |
| 5 | | | | | | | | | | | Antenna group 0 | |
| 6 | | Antenna group 2 | | | | Antenna group 0 | | | | | | |
| 7 | | | | | | | | | | | | |

FIG. 3A

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 8 | | | | | | | | | | | | |
| 9 | | | | Antenna group 0 | | | | | | Antenna group 1 | | |
| 10 | | | | | | | | Antenna group 1 | | | | Antenna group 2 |
| 11 | | | | | | | | | | | | |
| 12 | Antenna group 1 | | | | Antenna group 2 | | | | | | | |
| 13 | | | | | | | | | | | | |
| 14 | | | | | | | | | Antenna group 0 | | | |
| 15 | | | Antenna group 2 | | | | | | | | | |

FIG. 3B

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 16 | | | | | | | | | | | | |
| 17 | | | | | | | Antenna group 0 | | | | | |
| 18 | | Antenna group 0 | | | | | | | | | | |
| 19 | | | | | | Antenna group 1 | | | | | | |
| 20 | | | | | | | | | | Antenna group 2 | | |
| 21 | | | | Antenna group 1 | | | | | | | | |
| 22 | | | | | | | | Antenna group 2 | | | | |
| 23 | | | | | | | | | | | Antenna group 1 | Antenna group 0 |

FIG. 3C

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 24 | Antenna group 2 | | | | | | | | | | | |
| 25 | | | | | Antenna group 0 | | | | | | | |
| 26 | | | Antenna group 0 | | | | | | Antenna group 1 | | | |
| 27 | | | | | | | Antenna group 1 | | | | | |
| 28 | | | | | | | | | | | | |
| 29 | | Antenna group 1 | | | | Antenna group 2 | | | | | | |
| 30 | | | | | | | | | | | Antenna group 2 | |
| 31 | | | | | | | | | | | | |

FIG. 3D

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 32 | | | | | | | | | | | | |
| 33 | | | | Antenna group 2 | | | | | | | | |
| 34 | | | | | | | | Antenna group 0 | | | | |
| 35 | | | | | | | | | | | | Antenna group 1 |

FIG. 3E

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 0 | Antenna group 0 | | | | | | | | | | | |
| 1 | | | | | Antenna group 1 | | | | | | | |
| 2 | | | Antenna group 0 | | | | | | Antenna group 2 | | | |
| 3 | | | | | | | Antenna group 1 | | | | | |
| 4 | | | | | | | | | | | | |
| 5 | | | | | | Antenna group 1 | | | | | | |
| 6 | | Antenna group 0 | | | | | | | | | Antenna group 2 | |
| 7 | | | | | | | | | | | | |

FIG. 4A

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 8 | | | | | | | | | | | | |
| 9 | | | | Antenna group 0 | | | | | | Antenna group 2 | | |
| 10 | | | | | | | | Antenna group 1 | | | | |
| 11 | | | | | | | | | | | | Antenna group 2 |
| 12 | Antenna group 1 | | | | | | | | | | | |
| 13 | | | | | Antenna group 2 | | | | | | | |
| 14 | | | | | | | | | Antenna group 0 | | | |
| 15 | | | Antenna group 1 | | | | | | | | | |

FIG. 4B

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 16 | | | | | | | | | | | | |
| 17 | | | | | | | Antenna group 2 | | | | | |
| 18 | | Antenna group 1 | | | | | | | | | | |
| 19 | | | | | | Antenna group 2 | | | | | | |
| 20 | | | | | | | | | | Antenna group 0 | | |
| 21 | | | | Antenna group 1 | | | | | | | | |
| 22 | | | | | | | | Antenna group 2 | | | | |
| 23 | | | | | | | | | | | | Antenna group 0 |

FIG. 4C

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 24 | Antenna group 2 | | | | | | | | | | | |
| 25 | | | | | Antenna group 0 | | | | | | | |
| 26 | | | Antenna group 2 | | | | | | Antenna group 1 | | | |
| 27 | | | | | | | | | | | | |
| 28 | | | | | | | Antenna group 0 | | | | | |
| 29 | | Antenna group 2 | | | | | | | | | | |
| 30 | | | | | | Antenna group 0 | | | | | | |
| 31 | | | | | | | | | | | Antenna group 1 | |

FIG. 4D

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 32 | | | | | | | | | | Antenna group 1 | | |
| 33 | | | | Antenna group 2 | | | | | | | | |
| 34 | | | | | | | | Antenna group 0 | | | | |
| 35 | | | | | | | | | | | | Antenna group 1 |

FIG. 4E

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 |
|---|---|---|---|---|---|---|---|---|---|
| 0 | Antenna group 0 | | | | | | | | |
| 1 | | | | Antenna group 1 | | | | | |
| 2 | | Antenna group 1 | | | | | Antenna group 2 | | |
| 3 | | | | | | | | | |
| 4 | | | | | Antenna group 2 | | | | |
| 5 | | | Antenna group 2 | | | | | Antenna group 0 | |
| 6 | | | | | | Antenna group 0 | | | |
| 7 | | | | | | | | | |

FIG. 5A

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 |
|---|---|---|---|---|---|---|---|---|---|
| 8 | | | | | | | | | Antenna group 1 |
| 9 | Antenna group 1 | | | | | | | | |
| 10 | | | | Antenna group 2 | | | | | |
| 11 | | | | | | | Antenna group 0 | | |
| 12 | | Antenna group 2 | | | | | | | |
| 13 | | | | | Antenna group 0 | | | | |
| 14 | | | | | | | | Antenna group 1 | |
| 15 | | | Antenna group 0 | | | | | | |

FIG. 5B

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 |
|---|---|---|---|---|---|---|---|---|---|
| 16 | | | | | | | | | |
| 17 | | | | | | | | | Antenna group 2 |
| 18 | Antenna group 2 | | | | | | | | |
| 19 | | | | Antenna group 0 | | | | | |
| 20 | | | | | | | Antenna group 1 | | |
| 21 | | Antenna group 0 | | | | | | | |
| 22 | | | | | Antenna group 1 | | | | |
| 23 | | | | | | | | Antenna group 2 | |

FIG. 5C

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 |
|---|---|---|---|---|---|---|---|---|---|
| 24 | | | Antenna group 1 | | | | | | |
| 25 | | | | | | Antenna group 2 | | | |
| 26 | | | | | | | | | Antenna group 0 |

FIG. 5D

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 0 | Antenna group 0 | | | | | | | | | | | |
| 1 | | | | | Antenna group 1 | | | | | | | |
| 2 | | | | | | | | | Antenna group 2 | | | |
| 3 | | | Antenna group 1 | | | | | | | | | |
| 4 | | | | | | | Antenna group 2 | | | | | |
| 5 | | | | | | | | | | | Antenna group 0 | |
| 6 | | Antenna group 2 | | | | Antenna group 0 | | | | | | |
| 7 | | | | | | | | | | | | |

FIG. 6A

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 8 | | | | | | | | | | Antenna group 1 | | |
| 9 | | | | Antenna group 0 | | | | | | | | |
| 10 | | | | | | | | Antenna group 1 | | | | |
| 11 | | | | | | | | | | | | Antenna group 2 |
| 12 | Antenna group 2 | | | | | | | | | | | |
| 13 | | | | | Antenna group 0 | | | | | | | |
| 14 | | | | | | | | | Antenna group 1 | | | |
| 15 | | | Antenna group 0 | | | | | | | | | |

FIG. 6B

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 16 | | | | | | | | | | | | |
| 17 | | | | | | | Antenna group 1 | | | | Antenna group 2 | |
| 18 | | Antenna group 1 | | | | | | | | | | |
| 19 | | | | | | Antenna group 2 | | | | | | |
| 20 | | | | Antenna group 2 | | | | | | Antenna group 0 | | |
| 21 | | | | | | | | | | | | |
| 22 | | | | | | | | Antenna group 0 | | | | |
| 23 | | | | | | | | | | | | Antenna group 1 |

FIG. 6C

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 24 | Antenna group 1 | | | | | | | | | | | |
| 25 | | | | | Antenna group 2 | | | | | | | |
| 26 | | | | | | | | | Antenna group 0 | | | |
| 27 | | | Antenna group 2 | | | | | | | | | |
| 28 | | | | | | | Antenna group 0 | | | | | |
| 29 | | | | | | Antenna group 1 | | | | | | |
| 30 | | Antenna group 0 | | | | | | | | | | |
| 31 | | | | | | | | | | | Antenna group 1 | |

FIG. 6D

| $n_{SRS}$ | Sub-band 1 | Sub-band 2 | Sub-band 3 | Sub-band 4 | Sub-band 5 | Sub-band 6 | Sub-band 7 | Sub-band 8 | Sub-band 9 | Sub-band 10 | Sub-band 11 | Sub-band 12 |
|---|---|---|---|---|---|---|---|---|---|---|---|---|
| 32 | | | | | | | | | | | | |
| 33 | | | | Antenna group 1 | | | | | | | | |
| 34 | | | | | | | | Antenna group 2 | | | | |
| 35 | | | | | | | | | | | | Antenna group 0 |

SOUNDING REFERENCE SIGNAL TRANSMISSION METHOD, TERMINAL DEVICE, AND COMPUTER-READABLE STORAGE MEDIUM

CROSS-REFERENCE TO RELATED APPLICATIONS

This application is a continuation of International Application No. PCT/CN2018/081804, filed on Apr. 4, 2018, the disclosure of which is hereby incorporated by reference in its entirety.

TECHNICAL FIELD

This application relates to the communications field, and more specifically, to a sounding reference signal transmission method, a terminal device, and a computer-readable storage medium.

BACKGROUND

In a long term evolution (LTE) system, a sounding reference signal (SRS) is a signal for measuring channel state information (CSI) between a terminal device and a network device. The terminal device sends an SRS on an antenna to obtain uplink channel state information corresponding to each antenna, and the network device estimates, based on the received SRS, an uplink channel state corresponding to each antenna.

When a plurality of receive antennas are configured for the terminal device, to obtain complete channel information corresponding to all the antennas, the terminal device needs to perform antenna switching (namely, antenna selection) between the plurality of antennas for SRS transmission. An existing LTE protocol supports 1T2R antenna selection. To be specific, at a same moment, the terminal device selects one antenna from two antennas according to an antenna selection formula for SRS transmission.

With continuous development of communications technologies, a terminal device supporting 2T4R needs to select two antennas (one antenna group) from four antennas at a same moment for SRS transmission. The four antennas may be grouped into two antenna groups, or may be grouped into three antenna groups. The 1T2R antenna selection formula supported by the existing LTE protocol is not applicable to SRS antenna selection for three antenna groups.

SUMMARY

This application provides a sounding reference signal transmission method, a terminal device, and a computer-readable storage medium to support SRS antenna selection for three antenna groups.

According to a first aspect, a sounding reference signal transmission method is provided. The method includes: selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups, so that in a process of sending the SRS for $2\Lambda$ times, the SRS is sent through each of the $\Lambda$ antenna groups at least once, where $n_{SRS}$ is an integer greater than or equal to 0, and $\Lambda$ is a positive integer greater than or equal to 3; and sending, by the terminal device during the $n_{SRS}^{th}$ SRS transmission, the SRS through antenna ports included in the antenna group whose sequence number is $\alpha(n_{SRS})$.

In the foregoing technical solution, the terminal device may select, from the $\Lambda$ antenna groups based on the sequence number $n_{SRS}$ of the quantity of transmissions of the SRS and the quantity $\Lambda$ of antenna groups, the antenna group for sending the SRS, to support SRS antenna selection for three antenna groups. In this way, in the process of sending the SRS for $2\Lambda$ times, the SRS can be sent through each of the $\Lambda$ antenna groups at least once.

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: selecting, by the terminal device, the antenna group whose sequence number is $\alpha(n_{SRS})$ from the $\Lambda$ antenna groups based on the sequence number $n_{SRS}$ of the quantity of transmissions of the SRS, the quantity $\Lambda$ of antenna groups, and a quantity K of SRS transmission sub-bandwidths included in a frequency hopping bandwidth for the SRS, so that a sequence number $\alpha(n_{SRS}+iK)$ of an antenna group for sending the SRS for the $(n_{SRS}+iK)^{th}$ time is different from a sequence number $\alpha(n_{SRS}+(i-1)K)$ of an antenna group for sending the SRS for the $(n_{SRS}+(i-1)K)^{th}$ time and/or the sequence number $\alpha(n_{SRS}+iK)$ of the antenna group for sending the SRS for the $(n_{SRS}+iK)^{th}$ time is different from a sequence number $\alpha(n_{SRS}+(i+1)K)$ of an antenna group for sending the SRS for the $(n_{SRS}+(i+1)K)^{th}$ time, where i is an integer, $1 \le i \le (\Lambda-2)$, and K is a positive integer greater than 0.

In the foregoing technical solution, in a process of sending the SRS for $\Lambda K$ times, the SRS can be sent through each of the $\Lambda$ antenna groups once in any of the K SRS transmission sub-bandwidths included in the frequency hopping bandwidth for the SRS, so that each of the $\Lambda$ antenna groups can be traversed in the K SRS transmission sub-bandwidths.

In a possible implementation, selecting, by the terminal device, the antenna group whose sequence number is $\alpha(n_{SRS})$ from the $\Lambda$ antenna groups based on the sequence number $n_{SRS}$ of the quantity of transmissions of the SRS, the quantity $\Lambda$ of antenna groups, and a quantity K of SRS transmission sub-bandwidths included in a frequency hopping bandwidth for the SRS includes: when K is an integer multiple of $\Lambda$, determining, by the terminal device according to the following formula, the sequence number $\alpha(n_{SRS})$ of the antenna group for sending the SRS: $\alpha(n_{SRS}) = (n_{SRS} + \lfloor n_{SRS}/K \rfloor) \mod \Lambda$, where $\lfloor n_{SRS}/K \rfloor$ is used to represent a maximum integer not greater than $(n_{SRS}/K)$, and $(n_{SRS} + \lfloor n_{SRS}/K \rfloor) \mod \Lambda$ is used to represent a remainder obtained by dividing $(n_{SRS} + \lfloor n_{SRS}/K \rfloor)$ by $\Lambda$.

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: selecting, by the terminal device, the antenna group whose sequence number is $\alpha(n_{SRS})$ from the $\Lambda$ antenna groups based on the sequence number $n_{SRS}$ of the quantity of transmissions of the SRS and the quantity $\Lambda$ of antenna groups, so that the sequence number $\alpha(n_{SRS})$ of the antenna group for sending the SRS for the $n_{SRS}^{th}$ time is different from a sequence number $\alpha(n_{SRS}+\Lambda)$ of an antenna group for sending the SRS for the $n_{SRS}+\Lambda)^{th}$ time.

In the foregoing technical solution, in a process of sending the SRS for a limited quantity of times, for example, for K times, there can be a relatively large frequency spacing between two adjacent SRS sub-bandwidths occupied for sending the SRS through a same antenna group, so that SRS sub-bandwidths that are relatively discretely distributed are selected from the frequency hopping bandwidth for the same antenna group to send the SRS, and channel sounding within a larger bandwidth range can be implemented for a relatively small quantity of SRS transmissions, thereby improving efficiency and accuracy of the channel sounding.

In a possible implementation, selecting, by the terminal device, the antenna group whose sequence number is $\alpha(n_{SRS})$ from the $\Lambda$ antenna groups based on the sequence number $n_{SRS}$ of the quantity of transmissions of the SRS and the quantity $\Lambda$ of antenna groups includes: when K is an integer multiple of $\Lambda$, determining, by the terminal device according to the following formula, the sequence number $\alpha(n_{SRS})$ of the antenna group for sending the SRS: $\alpha(n_{SRS})=(n_{SRS}+\lfloor n_{SRS}/\Lambda \rfloor) \bmod \Lambda$, where $\lfloor n_{SRS}/\Lambda \rfloor$ is used to represent a maximum positive integer not greater than $(n_{SRS}/\Lambda)$, and $(n_{SRS}+\lfloor n_{SRS}/\Lambda \rfloor) \bmod \Lambda$ is used to represent a remainder obtained by dividing $(n_{SRS}+\lfloor n_{SRS}/\Lambda \rfloor)$ by $\Lambda$.

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: determining, by the terminal device according to the following formula, the sequence number $\alpha(n_{SRS})$ of the antenna group for sending the SRS:

$$a(n_{SRS}) = (n_{SRS} + \alpha \lfloor n_{SRS}/\Lambda \rfloor + \beta \lfloor n_{SRS}/K \rfloor) \bmod \Lambda, \text{ where}$$

$$\alpha = \begin{cases} 1 & \text{when } K \text{ is an integer multiple of } \Lambda \\ 0 & \text{in another case} \end{cases},$$

$$\beta = \begin{cases} 1 & \text{when } K \text{ is an integer multiple of } \Lambda^2 \\ 0 & \text{in another case} \end{cases},$$

and $(n_{SRS}+\alpha \lfloor n_{SRS}/\alpha \rfloor + \beta) \bmod \Lambda \bmod \Lambda$ is used to represent a remainder obtained by dividing $(n_{SRS}+\alpha \lfloor n_{SRS}/\Lambda \rfloor)+\beta \lfloor n_{SRS}/K \rfloor)$ by $\Lambda$.

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: determining, by the terminal device according to the following formula, the sequence number $\alpha(n_{SRS})$ of the antenna group for sending the SRS:

$$a(n_{SRS}) = (n_{SRS} + \alpha \lfloor n_{SRS}/\Lambda \rfloor + \beta \lfloor n_{SRS}/K \rfloor) \bmod \Lambda, \text{ where}$$

$$\alpha = \begin{cases} 1 & \text{when } K \text{ is any one in } \{9, 12, 18\} \\ 0 & \text{in another case} \end{cases}, \text{ and}$$

$$\beta = \begin{cases} 1 & \text{when } K \text{ is an integer multiple of } \Lambda \\ 0 & \text{in another case} \end{cases}.$$

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: determining, by the terminal device according to the following formula, the sequence number $\alpha(n_{SRS})$ of the antenna group for sending the SRS: $\alpha(n_{SRS})=n_{SRS} \bmod \Lambda$, where $n_{SRS} \bmod \Lambda$ is used to represent a remainder obtained by dividing $n_{SRS}$ by $\Lambda$.

In a possible implementation, each of the $\Lambda$ antenna groups includes at least two different antenna ports, and the $\Lambda$ antenna groups include all antenna ports of the terminal device.

According to a second aspect, a terminal device is provided. The terminal device includes: selecting, based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups, so that in a process of sending the SRS for $2\Lambda$ times, the SRS is sent through each of the $\Lambda$ antenna groups at least once, where $n_{SRS}$ is an integer greater than or equal to 0, and $\Lambda$ is a positive integer greater than or equal to 3 and during the $n_{SRS}^{th}$ SRS transmission, sending the SRS through antenna ports included in the antenna group whose sequence number is $\alpha(n_{SRS})$.

In a possible implementation, selecting, based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: selecting the antenna group whose sequence number is $\alpha(n_{SRS})$ from the $\Lambda$ antenna groups based on the sequence number $n_{SRS}$ of the quantity of transmissions of the SRS, the quantity $\Lambda$ of antenna groups, and a quantity K of SRS transmission sub-bandwidths included in a frequency hopping bandwidth for the SRS, so that a sequence number $\alpha(n_{SRS}+iK)$ of an antenna group for sending the SRS for the $(n_{SRS}+iK)^{th}$ time is different from a sequence number $\alpha(n_{SRS}+(i-1)K)$ of an antenna group for sending the SRS for the $(n_{SRS}+(i-1)K)^{th}$ time and/or the sequence number $\alpha(n_{SRS}+iK)$ of the antenna group for sending the SRS for the $(n_{SRS}+iK)^{th}$ time is different from a sequence number $\alpha(n_{SRS}+(i+1)K)$ of an antenna group for sending the SRS for the $(n_{SRS}+(i+1)K)^{th}$ time, where $1 \leq i \leq (\Lambda-2)$, and K is a positive integer greater than 0.

In a possible implementation, selecting the antenna group whose sequence number is $\alpha(n_{SRS})$ from the $\Lambda$ antenna groups based on the sequence number $n_{SRS}$ of the quantity of transmissions of the SRS, the quantity $\Lambda$ of antenna groups, and a quantity K of SRS transmission sub-bandwidths included in a frequency hopping bandwidth for the SRS includes: when K is an integer multiple of $\Lambda$, determining, according to the following formula, the sequence number $\alpha(n_{SRS})$ of the antenna group for sending the SRS: $\alpha(n_{SRS})=(n_{SRS}+\lfloor n_{SRS}/K \rfloor) \bmod \Lambda$, where $\lfloor n_{SRS}/K \rfloor$ is used to represent a maximum integer not greater than $n_{SRS}/K$, and $n_{SRS}+\lfloor n_{SRS}/K \rfloor \bmod \Lambda$ is used to represent a remainder obtained by dividing $(n_{SRS}+\lfloor n_{SRS}/K \rfloor)$ by $\Lambda$.

In a possible implementation, selecting, based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: selecting the antenna group whose sequence number is $\alpha(n_{SRS})$ from the $\Lambda$ antenna groups based on the sequence number $n_{SRS}$ of the quantity of transmissions of the SRS and the quantity $\Lambda$ of antenna groups, so that the sequence number $\alpha(n_{SRS})$ of the antenna group for sending the SRS for the $n_{SRS}^{th}$ time is different from a sequence number $\alpha(n_{SRS}+\Lambda)$ of an antenna group for sending the SRS for the $(n_{SRS}+\Lambda)^{th}$ time.

In a possible implementation, selecting the antenna group whose sequence number is $\alpha(n_{SRS})$ from the $\Lambda$ antenna groups based on the sequence number $n_{SRS}$ of the quantity of transmissions of the SRS and the quantity $\Lambda$ of antenna groups includes: when K is an integer multiple of $\Lambda$, determining, according to the following formula, the sequence number $\alpha(n_{SRS})$ of the antenna group for sending the SRS: $\alpha(n_{SRS})=(n_{SRS}+\lfloor n_{SRS}/\Lambda \rfloor) \mod \Lambda$, where $\lfloor n_{SRS}/\Lambda \rfloor$ is used to represent a maximum positive integer not greater than $(n_{SRS}/\Lambda)$, and $(n_{SRS}+\lfloor n_{SRS}/\Lambda \rfloor) \mod \Lambda$ is used to represent a remainder obtained by dividing $(n_{SRS}+\lfloor n_{SRS}/\Lambda \rfloor)$ by $\Lambda$.

In a possible implementation, selecting, by a terminal device based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: determining, by the terminal device according to the following formula, the sequence number $\alpha(n_{SRS})$ of the antenna group for sending the SRS: $\alpha(n_{SRS})=(n_{SRS}+\alpha\lfloor n_{SRS}/\Lambda \rfloor+\beta\lfloor n_{SRS}/K \rfloor) \mod \Lambda$, where $$\alpha = \begin{cases} 1 & \text{when } K \text{ is an integer multiple of } \Lambda \\ 0 & \text{in another case} \end{cases},$$

$$\beta = \begin{cases} 1 & \text{when } K \text{ is an integer multiple of } \Lambda^2 \\ 0 & \text{in another case} \end{cases},$$

and $(n_{SRS}+\alpha\lfloor n_{SRS}/\Lambda \rfloor+\beta\lfloor n_{SRS}/K \rfloor) \mod \Lambda$ is used to represent a remainder obtained by dividing $(n_{SRS}+\alpha\lfloor n_{SRS}/\Lambda \rfloor+\beta\lfloor n_{SRS}/K \rfloor)$ by $\Lambda$.

In a possible implementation, selecting, based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups includes: determining, according to the following formula, the sequence number $\alpha(n_{SRS})$ of the antenna group for sending the SRS: $\alpha(n_{SRS})=(n_{SRS}+\alpha\lfloor n_{SRS}/\Lambda \rfloor+\beta\lfloor n_{SRS}/K \rfloor) \mod \Lambda$, where $$\alpha = \begin{cases} 1 & \text{when } K \text{ is any one in } \{9, 12, 18\} \\ 0 & \text{in another case} \end{cases}, \text{ and}$$

$$\beta = \begin{cases} 1 & \text{when } K \text{ is an integer multiple of } \Lambda \\ 0 & \text{in another case} \end{cases}.$$

According to a third aspect, a terminal device is provided. The terminal device includes: a memory, a processor, and a transceiver, where the memory is configured to store a program; and the processor is configured to execute the program stored in the memory, and, when the program is executed, the processor performs the method according to any one of the first aspect or the possible implementations of the first aspect through the transceiver.

According to a fourth aspect, a chip is provided. The chip includes a memory, a processor, and a transceiver, where the memory is configured to store a program; and the processor is configured to execute the program stored in the memory, and, when the program is executed, the processor performs the method according to any one of the third aspect or the possible implementations of the third aspect through the transceiver.

According to a fifth aspect, a computer-readable storage medium is provided. The computer-readable storage medium includes a computer instruction, where, when the computer instruction is run on a terminal device, the terminal device is enabled to perform the method according to any one of the first aspect or the possible implementations of the first aspect.

According to a sixth aspect, a computer program product is provided. When the computer program product is run on a terminal device, the terminal device is enabled to perform the method according to any one of the first aspect or the possible implementations of the first aspect.

BRIEF DESCRIPTION OF DRAWINGS

FIGS. 2A-2D are a schematic structural diagram of a sounding reference signal transmission method according to another embodiment of this application;

FIGS. 3A-3E are a schematic structural diagram of a sounding reference signal transmission method according to another embodiment of this application;

FIGS. 4A-4E are a schematic structural diagram of a sounding reference signal transmission method according to another embodiment of this application;

FIGS. 5A-5D are a schematic structural diagram of a sounding reference signal transmission method according to another embodiment of this application;

FIGS. 6A-6E are a schematic structural diagram of a sounding reference signal transmission method according to another embodiment of this application.

DESCRIPTION OF EMBODIMENTS

Figure 1:
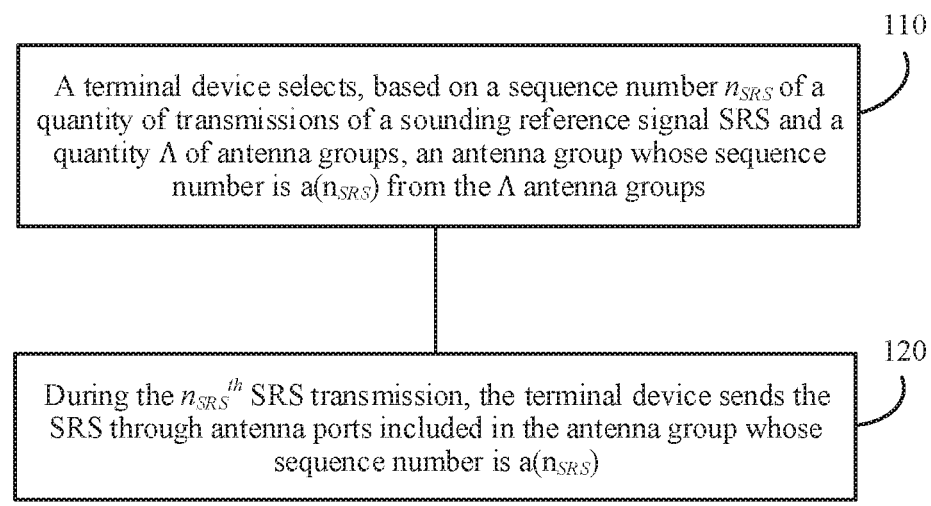
FIG. 1 is a schematic flowchart of a sounding reference signal transmission method according to an embodiment of this application.

The following describes the technical solutions of this application with reference to the accompanying drawings.

The technical solutions in the embodiments of this application may be applied to various communications systems, for example, a cellular-based narrowband internet of things (NB-IoT) system, a global system for mobile communications (GSM) system, a code division multiple access (CDMA) system, a wideband code division multiple access (WCDMA) system, a general packet radio service (CPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or a new radio (NR) system.

A type of a terminal device is not specifically limited in the embodiments of this application, and the terminal device may be any device configured to communicate with a network device. The terminal device may be, for example, user equipment, an access terminal, a terminal device, a subscriber unit, a subscriber station, a mobile station, a remote station, a remote terminal, a mobile device, a user terminal, a wireless network device, a user agent, or a user apparatus. The terminal may include but is not limited to a relay node, a mobile station (MS), a mobile telephone, user equipment (UE), a handset, portable equipment, a cellular phone, a cordless phone, a session initiation protocol (SIP) phone, a wireless local loop (WLL) station, a personal digital assistant (PDA), a radio frequency identification (RFID) terminal device used for logistics, a handheld device having a wireless communication function, a computing device, another device connected to a wireless modem, a vehicle-mounted device, a wearable device, a terminal device in an internet of things or an internet of vehicles, a terminal device in a future 5G network, a terminal device in a future evolved public land mobile network (PLMN), or the like.

By way of example and not limitation, in the embodiments of the present invention, the terminal device may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user. The wearable device not only is a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

A type of the network device is not specifically limited in the embodiments of this application. The network device may be any device configured to communicate with the terminal device. For example, the network device may be a base transceiver station (BTS) in global system for mobile communications (GSM) or code division multiple access (CDMA), a NodeB (NB) in the wideband code division multiple access (WCDMA) system, an evolved NodeB (evolutional NodeB, eNB or eNodeB) in the long term evolution (LTE) system, or a radio controller in a cloud radio access network (CRAN) scenario. Alternatively, the network device may be, for example, a relay station, an access point, a vehicle-mounted device, a wearable device, a network device in the future 5G network, or a network device in the future evolved PLMN.

The terminal device supporting 2T4R mentioned above means that the terminal device can support two transmit antennas links) and four receive antennas. At a same moment, to obtain complete channel information corresponding to the four receive antennas, the terminal device may select two antennas from the four receive antennas at the same moment based on antenna ports indicated by an antenna selection formula, and may send an SRS on two selected antenna ports.

There are many implementations of selecting two antenna ports from four antenna ports (for example, an antenna port 0, an antenna port 1, an antenna port 2, and an antenna port 3) based on different application scenarios and a construction implementation of the antenna ports of the terminal device. In an example, if the terminal device can flexibly group the four antenna ports in pairs, the four antenna ports may be grouped into two antenna groups by switching antenna switches. For example, the terminal device may group the four antenna ports into two antenna groups. Antenna ports included in one antenna group may be the antenna port 0 and the antenna port 1, and antenna ports included in the other antenna group may be the antenna port 2 and the antenna port 3. The terminal device may randomly select antenna ports included in one of the two antenna groups to send the SRS. In another example, if one transmit link of the terminal device is always connected to one antenna port, one of the remaining three antenna ports may be selected for the other transmit link by switching the antenna switches. For example, the terminal device may group the four antenna ports into three antenna groups. Antenna ports included in one antenna group may be the antenna port 0 and the antenna port 1, antenna ports included in another antenna group may be the antenna port 0 and the antenna port 2, and antenna ports included in still another antenna group may be the antenna port 0 and the antenna port 3. The terminal device may randomly select antenna ports included in one of the three antenna groups to send the SRS.

An existing LTE protocol can support antenna selection for two antenna groups, but cannot be applicable to antenna selection for three antenna groups (in other words, in an existing LTE system, one antenna group cannot be randomly selected from three antenna groups to send an SRS).

The embodiments of this application provide a sounding reference signal transmission method, to implement antenna selection for three antenna groups. The following describes the embodiments of this application in detail with reference to FIG. 1.

FIG. 1 is a schematic flowchart of a sounding reference signal transmission method according to an embodiment of this application. The method in FIG. 1 may include steps 110 and 120. The following separately describes steps 110 and 120 in detail.

Step 110. A terminal device selects, based on a sequence number $n_{SRS}$ of a quantity of transmissions of a sounding reference signal SRS and a quantity $\Lambda$ of antenna groups, an antenna group whose sequence number is $\alpha(n_{SRS})$ from the $\Lambda$ antenna groups.

In this embodiment of this application, the terminal device can support antenna selection. When the terminal device enables the antenna selection, the terminal device may select the antenna group whose sequence number is $\alpha(n_{SRS})$ from the $\Lambda$ antenna groups, and may send the SRS on the antenna group whose sequence number is $\alpha(n_{SRS})$, where $\alpha(n_{SRS})$ may be a positive integer greater than or equal to 0.

The terminal device may select, from the $\Lambda$ antenna groups, one antenna group for sending the SRS, so that in a process of sending the SRS for $2\Lambda$ times, the SRS is sent through each of the $\Lambda$ antenna groups at least once. For example, when $\Lambda$ is 3, the terminal device may select an antenna group 0 from the three antenna groups to send the SRS, or may select an antenna group 1 from the three antenna groups to send the SRS, or may select an antenna group 2 from the three antenna groups to send the SRS.

The quantity $\Lambda$ of antenna groups is not specifically limited in this embodiment of this application, and may be any positive integer greater than or equal to 3. Each of the $\Lambda$ antenna groups may include at least two different antenna ports, and a total set of antenna ports included in the $\Lambda$ antenna groups may include all antenna ports.

An allocation manner of the at least two antenna ports included in each of the antenna groups is not specifically limited in this embodiment of this application. In an example, all the antenna ports of the terminal device may be an antenna port 0, an antenna port 1, an antenna port 2, and an antenna port 3, and each of the $\Lambda$ antenna groups may include at least two different antenna ports. For example, the antenna group 0 may include the antenna port 0 and the antenna port 1, the antenna group 1 may include the antenna port 0 and the antenna port 2, and the antenna group 2 may include the antenna port 0 and the antenna port 3.

In each process of sending the SRS for K times, the SRS may be sent through the $\Lambda$ antenna groups equiprobably, and a difference between quantities of times of sending the SRS through the $\Lambda$ antenna groups may not exceed 1, where K may be used to represent a quantity of SRS transmission sub-bandwidths included in a frequency hopping bandwidth for the SRS, and K may be a positive integer greater than 0.

The antenna group for sending the SRS may use a frequency hopping manner, and the sequence number $n_{SRS}$ of the quantity of transmissions of the SRS may be used to represent a sequence number of a quantity of times of sending the SRS. For example, in a process of completing measurement of the entire frequency hopping bandwidth for the SRS for the first time, $n_{SRS}=0$ may be used to indicate that the SRS is sent for the first time, and $n_{SRS}=1$ may be used to indicate that the SRS is sent for the second time.

Step 110 may be implemented in many manners. This is not specifically limited in this embodiment of this application. In an example, the antenna group whose sequence number is $\alpha(n_{SRS})$ may be selected from the $\Lambda$ antenna groups based on the sequence number $n_{SRS}$ of the quantity of transmissions of the SRS and the quantity $\Lambda$ of antenna groups. In another example, the antenna group whose sequence number is $\alpha(n_{SRS})$ may be selected from the $\Lambda$ antenna groups based on the sequence number $n_{SRS}$ of the quantity of transmissions of the SRS, the quantity $\Lambda$ of antenna groups, and the quantity K of SRS transmission sub-bandwidths included in the frequency hopping bandwidth for the SRS. The following describes the two implementations in detail with reference to FIG. 2 to FIG. 6. Details are not described herein.

Step 120. During the $n_{SRS}^{th}$ SRS transmission, the terminal device sends the SRS through antenna ports included in the antenna group whose sequence number is $\alpha(n_{SRS})$.

In this embodiment of this application, the terminal device may select, from the $\Lambda$ antenna groups based on the sequence number $n_{SRS}$ of the quantity of transmissions of the SRS and the quantity $\Lambda$ of antenna groups, the antenna group for sending the SRS, so that the terminal device can support antenna selection for three antenna groups.

Optionally, in some embodiments, the terminal device may select, according to the following antenna selection formula, one antenna group from the $\Lambda$ antenna groups to send the SRS:

$$\alpha(n_{SRS})=n_{SRS} \bmod \Lambda \quad (1)$$

where $\alpha(n_{SRS})$, may be used to represent the sequence number of the antenna group for sending the SRS; and $n_{SRS} \bmod \Lambda$ may be used to represent a remainder obtained by dividing the sequence number $n_{SRS}$ of the quantity of transmissions of the SRS by the quantity $\Lambda$ of antenna groups.

It should be understood that at a moment, the terminal device may select, from the three antenna groups according to the formula (1), a sequence number of one antenna group for sending the SRS, and may send the SRS on the antenna ports included in the antenna group whose sequence number is an $\alpha(n_{SRS})$.

With reference to a specific example, the following describes in more detail a specific implementation of selecting, from the $\Lambda$ antenna groups according to the antenna selection formula (1), a sequence number of one antenna group for sending the SRS in this embodiment of this application. It should be noted that the example below is merely intended to help a person skilled in the art understand the embodiments of this application instead of limiting the embodiments of this application to a specific value or a specific scenario in the example. It is clear that a person skilled in the art can make various equivalent modifications or changes based on the example described above, and such modifications and changes also fall within the scope of the embodiments of this application.

FIG. 2 is a schematic structural diagram of a sounding reference signal transmission method according to another embodiment of this application. As shown in FIG. 2, descriptions are provided by using an example in which the quantity $\Lambda$ of antenna groups is 3 and the quantity K of SRS transmission sub-bandwidths included in the frequency hopping bandwidth for the SRS is 10.

When K is 10, it means that the terminal device may measure the entire frequency hopping bandwidth for the SRS once by completing frequency hopping for 10 times.

When the quantity $\Lambda$ of antenna groups is 3, it means that the four antenna ports may be grouped into three antenna groups. For example, the three antenna groups may include an antenna group 0, an antenna group 1, and an antenna group 2. At a same moment, the terminal device may select one antenna group from the antenna group 0, the antenna group 1, and the antenna group 2 according to the antenna selection formula (1) to send the SRS.

Referring to FIG. 2, in a process of sending the SRS for the first K times, the terminal device may select, from the three antenna groups according to the antenna selection formula (1), an antenna group for sending the SRS. In a process of sending the SRS for the first time (namely, $n_{SRS}=0$), the terminal device may choose to send the SRS in an SRS sub-bandwidth 1 (Which may also be referred to as a sub-band 1 or a band 1) through antenna ports included in the antenna group 0. In a process of sending the SRS for the second time (namely, n the terminal device may choose to send the SRS in an SRS sub-bandwidth 6 (which may also be referred to as a sub-band 6 or a band 6) through antenna ports included in the antenna group 1. In a process of sending the SRS for the third time (namely, $n_{SRS}=2$), the terminal device may choose to send the SRS in an SRS sub-bandwidth 3 (which may also be referred to as a sub-band 3 or a band 3) through antenna ports included in the antenna group 2. The rest may be deduced by analogy. In a process of sending the SRS for $\Lambda$K times, an SRS resource may be sequentially sent through the A antenna groups in ascending order of sequence numbers of the antenna groups.

Optionally, in some embodiments, when the quantity $\Lambda$ of antenna groups is 2, it means that the four antenna ports may be grouped into, for example, two antenna groups including an antenna group 0 and an antenna group 1. At a same moment, the terminal device may alternatively select either of the antenna group 0 and the antenna group 1 according to the antenna selection formula (1) to send the SRS.

It should be noted that in a frequency hopping process, a selection sequence of the SRS transmission sub-bandwidths included in the frequency hopping bandwidth for the SRS, a total frequency hopping bandwidth for the SRS, and the quantity of SRS transmission sub-bandwidths included in the frequency hopping bandwidth for the SRS are not specifically limited in this embodiment of this application, and may be set based on an SRS configuration parameter.

Optionally, in some embodiments, the terminal device may select the antenna group whose sequence number is $\alpha(n_{SRS})$ based on the sequence number $n_{SRS}$ of the quantity of transmissions of the SRS and the quantity $\Lambda$ of antenna groups, so that the sequence number $\alpha(n_{SRS})$ of the antenna group for sending the SRS for the $n_{SRS}^{th}$ time is different from a sequence number $\alpha(n_{SRS}+\Lambda)$ of an antenna group for sending the SRS for the $(n_{SRS}+\Lambda)^{th}$ time.

It should be understood that in some embodiments, the terminal device may select the antenna group whose sequence number is $\alpha(n_{SRS})$ based on the sequence number $n_{SRS}$ of the quantity of transmissions of the SRS and the quantity $\Lambda$ of antenna groups, so that in a process of sending the SRS for K times, a sequence including the sequence number of the antenna group selected for sending the SRS for the $n_{SRS}$ time to the sequence number of the antenna group selected for sending the SRS for the $(n_{SRS}+\Lambda)$ time may be a result obtained by performing cyclic shift on a sequence including the sequence number of the antenna group selected for sending the SRS for the $(n_{SRS}+\Lambda)$ time to a sequence number of an antenna group selected for sending the SRS for the $(n_{SRS}+2\Lambda)$ time. For example, sequence numbers of antenna groups selected for sending the SRS for the first time ($n_{SRS}$=0) to the third time ($n_{SRS}$=2) may be respectively the antenna group 0, the antenna group 1, and the antenna group 2. Sequence numbers of antenna groups selected for sending the SRS for the fourth time ($n_{SRS}$=3) to the sixth time ($n_{SRS}$=5) may be respectively the antenna group 1, the antenna group 2, and the antenna group 0. By analogy, a sequence including sequence numbers of antenna groups selected by the terminal device may have a cyclic shift feature.

The result obtained through the cyclic shift above is not specifically limited in this embodiment of this application. In an example, the sequence including the sequence number of the antenna group selected for sending the SRS for the $n_{SRS}$ time to the sequence number of the antenna group selected for sending the SRS for the $(n_{SRS}+\Lambda)$ time may be a result obtained by performing forward cyclic shift on the sequence including the sequence number of the antenna group selected for sending the SRS for the $(n_{SRS}+\Lambda)$ time to the sequence number of the antenna group selected for sending the SRS for the $(n_{SRS}+2\Lambda)$ time. In another example, the sequence including the sequence number of the antenna group selected for sending the SRS for the $n_{SRS}$ time to the sequence number of the antenna group selected for sending the SRS for the $(n_{SRS}+\Lambda)$ time may be a result obtained by performing backward cyclic shift on the sequence including the sequence number of the antenna group selected for sending the SRS for the $(n_{SRS}+\Lambda)$ time to the sequence number of the antenna group selected for sending the SRS for the $(n_{SRS}+2\Lambda)$ time.

In this embodiment of this application, in a process of sending the SRS for a limited quantity of times, for example, for K times, there can be a relatively large frequency spacing between two adjacent SRS sub-bandwidths occupied for sending the SRS through a same antenna group, so that SRS sub-bandwidths that are relatively discretely distributed are selected from the frequency hopping bandwidth for the same antenna group to send the SRS, and channel sounding within a larger bandwidth range can be implemented for a relatively small quantity of SRS transmissions, thereby improving efficiency and accuracy of the channel sounding.

Optionally, in some embodiments, the terminal device may select one antenna group from the $\Lambda$ antenna groups according to the following antenna selection formula to send the SRS, so that the sequence number $\alpha(n_{SRS})$ of the antenna group for sending the SRS for the $n_{SRS}{}^{th}$ time is different from a sequence number $\alpha(n_{SRS}+\Lambda)$ of an antenna group for sending the SRS for the $(n_{SRS}+\Lambda)^{th}$ time:

$$\alpha(n_{SRS})=(n_{SRS}+\lfloor n_{SRS}/\Lambda \rfloor) \bmod \Lambda \quad (2)$$

where $\alpha(n_{SRS})$ may be used to represent the sequence number of the antenna group for sending the SRS;

$\lfloor n_{SRS}/\Lambda \rfloor$ may be used to represent a maximum positive integer not greater than $(n_{SRS}/\Lambda)$; and $(n_{SRS}+\lfloor n_{SRS}/\Lambda \rfloor) \bmod \Lambda$ may be used to represent a remainder obtained by dividing $(n_{SRS}+\lfloor n_{SRS}/\Lambda \rfloor)$ by the quantity $\Lambda$ of antenna groups.

A value of the quantity K of SRS transmission sub-bandwidths included in the frequency hopping bandwidth for the SRS is not specifically limited in this embodiment of this application. In an example, when K is an integer multiple of the quantity $\Lambda$ of antenna groups, the terminal device may select one antenna group from the $\Lambda$ antenna groups according to the antenna selection formula (2) to send the SRS.

With reference to a specific example, the following describes in more detail a specific implementation in which a sequence number of one antenna group for sending the SRS is selected from the $\Lambda$ antenna groups according to the antenna selection formula (2), so that the sequence number $\alpha(n_{RSR})$ of the antenna group for sending the SRS for the $n_{SRS}{}^{th}$ time is different from the sequence number $\alpha(n_{SRS}+\Lambda)$ of the antenna group for sending the SRS for the $(n_{SRS}+\Lambda)^{th}$ time this embodiment of this application. It should be noted that the example below is merely intended to help a person skilled in the art understand the embodiments of this application, instead of limiting the embodiments of this application to a specific value or a specific scenario in the example. It is clear that a person skilled in the art can make various equivalent modifications or changes based on the example described above, and such modifications and changes also fall within the scope of the embodiments of this application.

FIG. 3 is a schematic structural diagram of a sounding reference signal transmission method according to another embodiment of this application. When the quantity K of SRS transmission sub-bandwidths included in the frequency hopping bandwidth for the SRS is an integer multiple of the quantity $\Lambda$ of antenna groups, as shown in FIG. 3, when the quantity $\Lambda$ of antenna groups is 3 and K is 12, at a moment, the terminal device may select one antenna group from an antenna group 0, an antenna group 1, and an antenna group 2 according to the antenna selection formula (2) to send the SRS.

Referring to FIG. 3, in a process of sending the SRS for the first K times, the terminal device may select, from the three antenna groups according to the antenna selection formula (2), the antenna group for sending the SRS. In a process of sending the SRS for the first time ($n_{SRS}$=0) to the third time ($n_{SRS}$=2), sequence numbers of antenna groups selected for sending the SRS are sequentially the antenna group 0, the antenna group 1, and the antenna group 2. In a process of sending the SRS for the fourth time ($n_{SRS}$=3) to the sixth time ($n_{SRS}$=5), sequence numbers of antenna groups selected for sending the SRS are sequentially the antenna group 1, the antenna group 2, and the antenna group 0. In a process of sending the SRS for the seventh time ($n_{SRS}$=6) to the ninth time ($n_{SRS}$=8), sequence numbers of antenna groups selected for sending the SRS are sequentially the antenna group 2, the antenna group 0, and the antenna group 1.

Optionally, in some embodiments, when the quantity $\Lambda$ of antenna groups is 2, it means that the four antenna ports may be grouped into, for example, two antenna groups including an antenna group 0 and an antenna group 1. At a same moment, the terminal device may alternatively select either of the antenna group 0 and the antenna group 1 according to the antenna selection formula (2) to send the SRS, so that the sequence number $\alpha(n_{SRS})$ of the antenna group for sending the SRS for the $n_{SRS}{}^{th}$ time is different from the sequence number $\alpha(n_{SRS}+\Lambda)$ of the antenna group for sending the SRS for the $(n_{SRS}+\Lambda)^{th}$ time.

As shown in FIG. 3, in a process of sending the SRS for $K\Lambda$ times, there can be, in a process of sending the SRS for a limited quantity of times, for example, for K times, a relatively large frequency spacing between two adjacent SRS sub-bandwidths occupied for sending the SRS through a same antenna group (for example, the antenna group 1). In this way, SRS sub-bandwidths that are relatively discretely distributed are selected from the frequency hopping bandwidth for the same antenna group to send the SRS, so that channel sounding within a larger bandwidth range can be implemented for a relatively small quantity of SRS transmissions, thereby improving efficiency and accuracy of the channel sounding.

FIG. 2 and FIG. 3 show that the antenna group for sending the SRS is selected based on the sequence number $n_{SRS}$ of the quantity of transmissions of the SRS and the quantity $\Lambda$ of antenna groups. Optionally, in some embodiments, the terminal device may alternatively select, based on the sequence number $n_{SRS}$ of the quantity of transmissions of the SRS, the quantity $\Lambda$ of antenna groups, and the quantity K of SRS transmission sub-bandwidths included in the frequency hopping bandwidth for the SRS, the antenna group for sending the SRS. The following describes the implementation in detail.

In this embodiment of this application, the terminal device may select, based on the sequence number $n_{SRS}$ of the quantity of transmissions of the SRS, the quantity $\Lambda$ of antenna groups, and the quantity K of SRS transmission sub-bandwidths included in the frequency hopping bandwidth for the SRS, the antenna group for sending the SRS, so that in a process of completing measurement of the frequency hopping bandwidth for the SRS (in other words, in a process of sending the SRS for $\Lambda$K times), the SRS can be sent through each of the $\Lambda$ antenna groups once in any SRS transmission sub-bandwidth included in the frequency hopping bandwidth for the SRS. In an example, the terminal device may select, based on the sequence number $n_{SRS}$ of the quantity of transmissions of the SRS, the quantity $\Lambda$ of antenna groups, and the quantity K of SRS transmission sub-bandwidths included in the frequency hopping bandwidth for the SRS, the antenna group for sending the SRS, so that in the process of AK transmissions, a sequence number $\alpha(n_{SRS}+iK)$ of an antenna group for sending the SRS for the $(n_{SRS}+iK)^{th}$ time is different from a sequence number $\alpha(n_{SRS}+(i-1)K)$ of an antenna group for sending the SRS for the $(n_{SRS}+(i-1)K)^{th}$ time and/or the sequence number $\alpha(n_{SRS}+iK)$ of the antenna group for sending the SRS for the $(n_{SRS}+iK)^{th}$ time is different from a sequence number $\alpha(n_{SRS}+(i+1)K)$ of an antenna group for sending the SRS for the $(n_{SRS}+(i+1)K)^{th}$ time, where i may be an integer greater than or equal to 0 and less than or equal to ($\Lambda-2$).

It should be understood that the terminal device may select, based on $n_{SRS}$, $\Lambda$, and K, the antenna group for sending the SRS, so that in the process of sending the SRS for $\Lambda$K times, a sequence including sequence numbers of antenna groups selected for sending the SRS for the first K times may be a result obtained by performing cyclic shift on a sequence including sequence numbers of antenna groups selected in a next process of sending the SRS for K times. For example, sequence numbers of antenna groups selected for sending the SRS for the first time ($n_{SRS}$=0) to the K$^{th}$ time ($n_{SRS}$=K−1) are 0, 1, 2, 0, 1, 2, and the like; sequence numbers of antenna groups selected in a process of sending the SRS for the (K+1)$^{th}$ time ($n_{SRS}$=K) to the 2K$^{th}$ time ($n_{SRS}$=2K−1) are 1, 2, 0, 1, 2, 0, and the like; sequence numbers of antenna groups selected in a process of sending the SRS for the (2K+1)$^{th}$ time ($n_{SRS}$=2K) to the 3K$^{th}$ time ($n_{SRS}$=3K−1) are 2, 0, 1, 2, 0, 1, and the like.

In this embodiment of this application, in the process of sending the SRS for $\Lambda$K times, the SRS can be sent through each of the $\Lambda$ antenna groups once in the K SRS transmission sub-bandwidths included in the frequency hopping bandwidth for the SRS, so that each of the $\Lambda$ antenna groups can be traversed in the K sub-bandwidths, to obtain complete channel information of the K sub-bandwidths that corresponds to all the antenna ports.

Optionally, in some embodiments, the terminal device may select one antenna group from the $\Lambda$ antenna groups according to the following antenna selection formula to send the SRS, so that in a process of completing scanning of the frequency hopping bandwidth for the SRS (in other words, in the process of sending the SRS for $\Lambda$K times), the SRS can be sent through each of the $\Lambda$ antenna groups once in any SRS transmission sub-bandwidth included in the frequency hopping bandwidth for the SRS:

$$(n_{SRS})=(n_{SRS}+\lfloor n_{SRS}/K \rfloor) \bmod \Lambda \qquad (3)$$

where $\lfloor n_{SRS}/K \rfloor$ may be used to represent a maximum positive integer not greater than ($n_{SRS}/K$); and $(n_{SRS}+\lfloor n_{SRS}/K \rfloor) \bmod \Lambda$ may be used to represent a remainder obtained by dividing ($n_{SRS}+\lfloor n_{SRS}/K \rfloor$) by the quantity $\Lambda$ of antenna groups.

A value of the quantity K of SRS transmission sub-bandwidths included in the frequency hopping bandwidth for the SRS is not specifically limited in this embodiment of this application. In an example, the quantity K may be any positive integer greater than 0. In another example, the quantity K may be an integer multiple of the quantity $\Lambda$ of antenna groups. For example, when K is an integer multiple of the quantity $\Lambda$ of antenna groups, the terminal device may select one antenna group from the $\Lambda$ antenna groups according to the antenna selection formula (3) to send the SRS.

In the process of sending the SRS for $\Lambda$K times, the terminal device may select one antenna group from the $\Lambda$ antenna groups according to the antenna selection formula (3) to send the SRS, so that in the process of completing measurement of the frequency hopping bandwidth for the SRS (in other words, in the process of sending the SRS for $\Lambda$K times), the SRS can be sent through each of the $\Lambda$ antenna groups once in any SRS transmission sub-bandwidth included in the frequency hopping bandwidth for the SRS.

With reference to a specific example, the following describes in more detail a specific implementation in which a sequence number of one antenna group for sending the SRS may be selected from the $\Lambda$ antenna groups according to the antenna selection formula (3), so that in the process of completing scanning of the frequency hopping bandwidth for the SRS (in other words, in the process of sending the SRS for $\Lambda$K times), the SRS can be sent through each of the $\Lambda$ antenna groups once in any SRS transmission sub-bandwidth included in the frequency hopping bandwidth for the SRS in this embodiment of this application. It should be noted that the example below is merely intended to help a person skilled in the art understand the embodiments of this application, instead of limiting the embodiments of this application to a specific value or a specific scenario in the example. It is clear that a person skilled in the art can make various equivalent modifications or changes based on the example described above, and such modifications and changes also fall within the scope of the embodiments of this application.

FIG. 4 is a schematic structural diagram of a sounding reference signal transmission method according to another embodiment of this application. As shown in FIG. 4, when the quantity $\Lambda$ of antenna groups is 3 and K is 12, at a moment, the terminal device may select one antenna group from an antenna group 0, an antenna group 1, and an antenna group 2 according to the antenna selection formula (3) to send the SRS.

Referring to FIG. 4, for example, in an SRS sub-bandwidth 1 (which may also be referred to as a sub-band 1 or a band 1), a sequence number of an antenna group for sending the SRS for the first time ($n_{SRS}=0$) is the antenna group 0, a sequence number of an antenna group for sending the SRS for the 13$^{th}$ time ($n_{SRS}=12$, namely, ($n_{SRS}+K$)) is the antenna group 1, and a sequence number of an antenna group for sending the SRS for the 25$^{th}$ time ($n_{SRS}=24$, namely, ($n_{SRS}+2K$)) is the antenna group 2.

As shown in FIG. 4, in the process of sending the SRS for KΛ times, the SRS can be sent through each of the Λ antenna groups once in a same sub-bandwidth (for example, the SRS sub-bandwidth 1). In other words, the SRS can be sent through each of the Λ antenna groups once in any SRS transmission sub-bandwidth included in the frequency hopping bandwidth for the SRS.

Optionally, in some embodiments, when the quantity Λ of antenna groups is 2, it means that the four antenna ports may be grouped into two antenna groups including an antenna group 0 and an antenna group 1. At a same moment, the terminal device may alternatively select either of the antenna group 0 and the antenna group 1 according to the antenna selection formula (3) to send the SRS, so that in the process of completing measurement of the frequency hopping bandwidth for the SRS (in other words, in the process of sending the SRS for ΛK times), the SRS can be sent through each of the Λ antenna groups once in any SRS transmission sub-bandwidth included in the frequency hopping bandwidth for the SRS.

Optionally, in some embodiments, the terminal device may alternatively select, from the Λ antenna groups according to the following formula, the sequence number $\alpha(n_{SRS})$ of the antenna group for sending the SRS:

$$(n_{SRS}) = (n_{SRS} + \alpha \lfloor n_{SRS}/\Lambda \rfloor + \beta \lfloor n_{SRS}/K \rfloor) \bmod \Lambda \qquad (4)$$

where $\alpha \in \{0, 1\}$, and $\beta \in \{0, 1\}$; and
$(n_{SRS}+\alpha \lfloor n_{SRS}/\Lambda \rfloor + \beta \lfloor n_{SRS}/K \rfloor) \bmod \Lambda$ is used to represent a remainder obtained by dividing $(n_{SRS}+\alpha \lfloor n_{SRS}/\Lambda \rfloor + \beta \lfloor n_{SRS}/K \rfloor)$ by Λ.

Optionally, in some embodiments, when the quantity Λ of antenna groups is 2, it means that the four antenna ports may be grouped into two antenna groups including an antenna group 0 and an antenna group 1. At a same moment, the terminal device may alternatively select either of the antenna group 0 and the antenna group 1 according to the antenna selection formula (4) to send the SRS.

Optionally, in some embodiments, the terminal device may alternatively select, from the Λ antenna groups according to the following formula, the sequence number $\alpha(n_{SRS})$ of the antenna group for sending the SRS, and when Λ is 3 and K is a positive integer multiple of Λ, in a process of sending the SRS for KΛ times, the SRS can be sent through each of the Λ antenna groups once in any SRS transmission sub-bandwidth included in the frequency hopping bandwidth for the SRS:

$$(n_{SRS}) = (n_{SRS} + \alpha \lfloor n_{SRS}/\Lambda \rfloor + \beta \lfloor n_{SRS}/K \rfloor) \bmod \Lambda \qquad (5)$$

where $$\alpha = \begin{cases} 1 & \text{(when } \Lambda = 2 \text{ and } K \text{ is an even number)} \\ 0 & \text{in another case} \end{cases} ; \text{and}$$

$$\beta = \begin{cases} 1 & \text{when } (\Lambda = 2 \text{ and } K \bmod 4 = 0) \text{ or } (\Lambda = 3 \text{ and } K \bmod 3 = 0) \\ 0 & \text{in another case} \end{cases}.$$

Optionally, in some embodiments, the terminal device may alternatively select, from the Λ antenna groups according to the following formula, the sequence number $\alpha(n_{SRS})$ of the antenna group for sending the SRS, so that in a process of sending the SRS for KΛ times, the SRS can be sent through each of the Λ antenna groups once in any SRS transmission sub-bandwidth included in the frequency hopping bandwidth for the SRS; and in a process of sending the SRS for a limited quantity of times, for example, for K times, there can be a relatively large frequency spacing between two adjacent SRS sub-bandwidths occupied for sending the SRS through a same antenna group, so that SRS sub-bandwidths that are relatively discretely distributed are selected from the frequency hopping bandwidth for the same antenna group to send the SRS, and channel sounding within a larger bandwidth range can be implemented for a relatively small quantity of SRS transmissions, thereby improving efficiency and accuracy of the channel sounding:

$$(n_{SRS}) = (n_{SRS} + \alpha \lfloor n_{SRS}/\Lambda \rfloor + \alpha \lfloor n_{SRS}/K \rfloor) \bmod \Lambda \qquad (6)$$

where $(n_{SRS}+\alpha \lfloor n_{SRS}/\Lambda \rfloor + \beta \lfloor n_{SRS}/K \rfloor) \bmod \Lambda$ is used to represent a remainder obtained by dividing $(n_{SRS}+\alpha \lfloor n_{SRS}/\Lambda \rfloor + \beta \lfloor n_{SRS}/K \rfloor)$ by Λ.

A value of the quantity K of SRS transmission sub-bandwidths included in the frequency hopping bandwidth for the SRS is not specifically limited in this embodiment of this application, n an example, when K is an integer multiple of the quantity Λ of antenna groups, a value of the parameter α may be 1; and when K is an integer multiple of the quantity Λ² of antenna groups, a value of the parameter β may be 1.

With reference to a specific example, the following describes in more detail a specific implementation in which the sequence number $\alpha(n_{SRS})$ of the antenna group for sending the SRS may be selected from the Λ antenna groups according to the antenna selection formula (6), so that in the process of sending the SRS for KΛ times, the SRS can be sent through each of the Λ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding in this embodiment of this application. It should be noted that the example below is merely intended to help a person skilled in the art understand the embodiments of this application, instead of limiting the embodiments of this application to a specific value or a specific scenario in the example. It is clear that a person skilled in the art can make various equivalent modifications or changes based on the example described above, and such modifications and changes also fall within the scope of the embodiments of this application.

FIG. 5 is a schematic structural diagram of a sounding reference signal transmission method according to another embodiment of this application. As shown in FIG. 5, when the quantity $\Lambda$ of antenna groups is 3 and K is 9, the terminal device may select one antenna group from the foregoing three antenna groups according to the antenna selection formula (6) to send the SRS, so that in the process of sending the SRS for K$\Lambda$ times, the SRS can be sent through each of the $\Lambda$ antenna groups in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

Referring to FIG. 5, when the quantity $\Lambda$ of antenna groups is 3 and K is 9, for example, in an SRS sub-bandwidth 1 (which may also be referred to as a sub-band 1 or a band 1), a sequence number of an antenna group for sending the SRS for the first time ($n_{SRS}$=0) is the antenna group 0, a sequence number of an antenna group for sending the SRS for the 10$^{th}$ time ($n_{SRS}$=9, namely, ($n_{SRS}$+K)) is the antenna group 1, and a sequence number of an antenna group for sending the SRS for the 19$^{th}$ time ($n_{SRS}$=18, namely, ($n_{SRS}$+2K)) is the antenna group 2. For another example, in the process of sending the SRS for K times (nine times), there is a relatively large frequency spacing between the sub-bandwidth 1 and a sub-bandwidth 6 that are occupied for sending the SRS through a same antenna group (for example, the antenna group 0).

Optionally, in some embodiments, when the quantity $\Lambda$ of antenna groups is 2, it means that the four antenna ports may be grouped into two antenna groups including an antenna group 0 and an antenna group 1. At a same moment, the terminal device may alternatively select either of the antenna group 0 and the antenna group 1 according to the antenna selection formula (2) to send the SRS, so that in the process of sending the SRS for K$\Lambda$ times, the SRS can be sent through each of the $\Lambda$ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

As shown in FIG. 5, in the process of sending the SRS for K$\Lambda$ times, the SRS can be sent through each of the $\Lambda$ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

Optionally, in some embodiments, the terminal device may alternatively select, from the $\Lambda$ antenna groups according to the following formula, the sequence number $\alpha(n_{SRS})$ of the antenna group for sending the SRS, so that in a process of sending the SRS for K$\Lambda$ times, the SRS can be sent through each of the $\Lambda$ antenna groups once in any SRS transmission sub-bandwidth included in the frequency hopping bandwidth for the SRS; and in a process of sending the SRS for a limited quantity of times, for example, for K times, there can be a relatively large frequency spacing between two adjacent SRS sub-bandwidths occupied for sending the SRS through a same antenna group, so that SRS sub-bandwidths that are relatively discretely distributed are selected from the frequency hopping bandwidth for the same antenna group to send the SRS, and channel sounding within a larger bandwidth range can be implemented for a relatively small quantity of SRS transmissions, thereby improving efficiency and accuracy of the channel sounding:

$$(n_{SRS})=(n_{SRS}+a\lfloor n_{SRS}/\Lambda\rfloor+\alpha\lfloor n_{SRS}/K\rfloor) \bmod \Lambda \quad (7)$$

A value of the quantity K of SRS transmission sub-bandwidths included in the frequency hopping bandwidth for the SRS is not specifically limited in this embodiment of this application. In an example, when K is any one in a set {9, 12, 18}, a value of the parameter $\alpha$ may be 1; and when K is an integer multiple of the quantity $\Lambda$ of antenna groups, a value of the parameter $\beta$ may be 1.

With reference to a specific example, the following describes in more detail a specific implementation in which the sequence number $\alpha(n_{SRS})$ of the antenna group for sending the SRS may be selected from the $\Lambda$ antenna groups according to the antenna selection formula (7), so that in the process of sending the SRS for K$\Lambda$ times, the SRS can be sent through each of the $\Lambda$ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding in this embodiment of this application. It should be noted that the example below is merely intended to help a person skilled in the art understand the embodiments of this application, instead of limiting the embodiments of this application to a specific value or a specific scenario in the example. It is clear that a person skilled in the art can make various equivalent modifications or changes based on the example described above, and such modifications and changes also fall within the scope of the embodiments of this application.

FIG. 6 is a schematic structural diagram of a sounding reference signal transmission method according to another embodiment of this application. When K is any one in a set {9, 12, 18}, as shown in FIG. 6, when the quantity 11 of antenna groups is 3 and K is 12, the terminal device may select one antenna group from the foregoing three antenna groups according to the antenna selection formula (7) to send the SRS, so that in the process of sending the SRS for KΛ times, the SRS can be sent through each of the Λ antenna groups in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

Referring to FIG. 6, when the quantity Λ of antenna groups is 3 and K is 12, for example, in an SRS sub-bandwidth 1 (a band 1), a sequence number of an antenna group for sending the SRS for the first time ($n_{SRS}=0$) is the antenna group 0, a sequence number of an antenna group for sending the SRS for the 13$^{th}$ time ($n_{SRS}=12$, namely, ($n_{SRS}+$K)) is the antenna group 2, and a sequence number of an antenna group for sending the SRS for the 25$^{th}$ time ($n_{SRS}=24$, namely ($n_{SRS}+2K$)) is the antenna group 1.

Optionally, in some embodiments, when the quantity Λ of antenna groups is 2, it means that the four antenna ports may be grouped into two antenna groups including an antenna group 0 and an antenna group 1. At a moment, the terminal device may alternatively select either of the antenna group 0 and the antenna group 1 according to the antenna selection formula (2) to send the SRS, so that in the process of sending the SRS for KΛ times, the SRS can be sent through each of the Λ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

As shown in FIG. 6, in the process of sending the SRS for KΛ times, the SRS can be sent through each of the Λ antenna groups once in any SRS transmission sub-bandwidth included in the frequency hopping bandwidth for the SRS; and in the process of sending the SRS for the limited quantity of times, for example, for K times, the SRS sub-bandwidths that are relatively discretely distributed can be selected from the frequency hopping bandwidth for the same antenna group to send the SRS, so that the channel sounding within the larger bandwidth range can be implemented for the relatively small quantity of SRS transmissions, thereby improving the efficiency and the accuracy of the channel sounding.

The foregoing describes in detail, with reference to FIG. 1 to FIG. 6, the sounding reference signal transmission method provided in the embodiments of this application. The following describes in detail, with reference to FIG. 7, a terminal device provided in the embodiments of this application.

Figure 7:
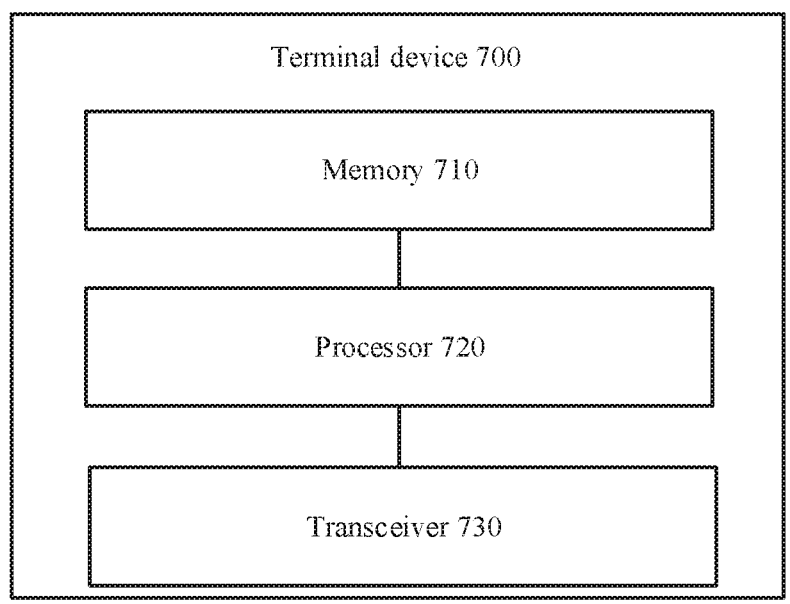
FIG. 7 is a schematic structural diagram of a terminal device according to an embodiment of this application.

FIG. 7 is a schematic structural diagram of a terminal device according to an embodiment of this application. The terminal device 700 in FIG. 7 may perform the sounding reference signal transmission method described in any one of the embodiments in FIG. 1 to FIG. 6. The terminal device 700 in FIG. 7 may include a memory 710, a processor 720, and a transceiver 730. The memory 710 may be configured to store a program, and the processor 720 may be configured to execute the program stored in the memory 710. When the program stored in the memory 710 is executed, the processor 720 may perform, through the transceiver 730, the sounding reference signal transmission method described in any one of the foregoing embodiments.

It should be understood that, the term "and/or" in the embodiments of this application describes only an association relationship for describing associated objects and represents that three relationships may exist. For example, A and/or B may represent the following cases: only A exists, both A and B exist, and only B exists.

In the foregoing embodiments, the processor may be a central processing unit (CPU), a microprocessor, an application-specific integrated circuit (ASIC), one or more integrated circuits for controlling program execution in the solutions of this application, or the like. For example, the processor may include a digital signal processor device, a microprocessor device, an analog-to-digital converter, or a digital-to-analog converter. The processor may allocate control and signal processing functions of mobile devices between these devices based on respective functions of the devices. In addition, the processor may include functions for operating one or more software programs, and the software programs may be stored in the memory.

The memory may be a read-only memory (ROM), another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a signal structure and that can be accessed by a computer. However, the memory is not limited thereto. The memory may exist alone, or may be integrated into the processor.

The transceiver may include, for example, an infrared transceiver, an RF transceiver, a wireless universal serial bus (USB) transceiver, or a Bluetooth transceiver. Although not shown, the terminal device and a network device may use a corresponding communications technology to send information (or a signal) through a transmitter, and/or receive information (a signal) through a receiver.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sounding reference signal transmissions, comprising:

determining, by a terminal device, that a sounding reference signal (SRS) to be transmitted is $n_{SRS}^{th}$ transmission of a plurality of SRS transmissions, wherein $n_{SRS}$ is a non-negative integer;

selecting, by a terminal device, an antenna group of $\Lambda$ antenna groups to transmit the sounding reference signal (SRS) based on $\Lambda$ and $n_{SRS}$, such that when sending the SRS for $2\Lambda$ times, the SRS is sent through each of the $\Lambda$ antenna groups at least once, wherein $\Lambda$ is a positive integer greater than or equal to 3, wherein the selected antenna group for transmitting the SRS for the $n_{SRS}^{th}$ time has an index number $\alpha(n_{SRS})$ determined based on:

$$a(n_{SRS}) = (n_{SRS} + \alpha\lfloor n_{SRS}/\Lambda \rfloor + \beta\lfloor n_{SRS}/K \rfloor) \bmod \Lambda$$

wherein $$\alpha = \begin{cases} 1 & \text{when } K \text{ is an integer multiple of } \Lambda \\ 0 & \text{otherwise} \end{cases}, \text{ and}$$

$$\beta = \begin{cases} 1 & \text{when } K \text{ is an integer multiple of } \Lambda^2 \\ 0 & \text{otherwise} \end{cases};$$

and $(n_{SRS}+\alpha\lfloor n_{SRS}/\Lambda \rfloor+\beta\lfloor n_{SRS}/K \rfloor) \bmod \Lambda$ represents a remainder obtained based on dividing $(n_{SRS}+\alpha\lfloor n_{SRS}/\Lambda \rfloor+\beta\lfloor n_{SRS}/K \rfloor)$ by $\Lambda$, where $K$ is a positive integer; and sending, by the terminal device during the $n_{SRS}^{th}$ transmission, the SRS through antenna ports comprised in the selected antenna group.

2. The method according to claim 1, wherein the positive integer K is a quantity of SRS transmission sub-bandwidths comprised in a frequency hopping bandwidth for the SRS, and wherein the antenna group of the $\Lambda$ antenna groups is further selected based on the K SRS transmission sub-bandwidths, such that an antenna group for sending the SRS for the $(n_{SRS}+iK)^{th}$ time is different from an antenna group for sending the SRS for the $(n_{SRS}+(i-1)K)^{th}$ time or the antenna group for sending the SRS for the $(n_{SRS}+iK)^{th}$ time is different from an antenna group for sending the SRS for the $(n_{SRS}+(i+1)K)^{th}$ time, wherein $1 \leq t \leq (\Lambda-2)$.

3. The method according to claim 1, wherein the antenna group is further selected such that the antenna group for sending the SRS for the $n_{SRS}^{th}$ time is different from an antenna group for sending the SRS for the $n_{SRS}+\Lambda^{th}$ time.

4. The method according to claim 1, wherein each of the $\Lambda$ antenna groups comprises at least two different antenna ports, and the $\Lambda$ antenna groups comprise all antenna ports of the terminal device.

5. A terminal device, comprising:
at least one processor; and
a non-transitory computer-readable storage medium coupled to the at least one processor and storing programming instructions for execution by the at least one processor, wherein the programming instructions instruct the at least one processor to:
determine, that a sounding reference signal (SRS) to be transmitted is an $n_{SRS}{}^{th}$ transmission of a plurality of SRS transmissions, wherein $n_{SRS}$ is a non-negative integer;
select an antenna group of Λ antenna groups to transmit the sounding reference signal (SRS) based on Λ $n_{SRS}$, and such that when sending the SRS for 2Λ times, the SRS is sent through each of the Λ antenna groups at least once, wherein Λ is a positive integer greater than or equal to 3, wherein the selected antenna group for transmitting the SRS for the $n_{SRS}{}^{th}$ time has an index number $\alpha(n_{SRS})$ determined based on:

$$a(n_{SRS}) = (n_{SRS} + \alpha\lfloor n_{SRS}/\Lambda\rfloor + \beta\lfloor n_{SRS}/K\rfloor) \mod \Lambda$$

wherein $$\alpha = \begin{cases} 1 & \text{when } K \text{ is an integer multiple of } \Lambda \\ 0 & \text{otherwise} \end{cases}, \text{ and}$$

$$\beta = \begin{cases} 1 & \text{when } K \text{ is an integer multiple of } \Lambda^2 \\ 0 & \text{otherwise} \end{cases};$$

and
$(n_{SRS}+\alpha\lfloor n_{SRS}/\Lambda\rfloor+\beta\lfloor n_{SRS}/K\rfloor)$ mod Λ represents a remainder obtained based on dividing $(n_{SRS}+\alpha\lfloor n_{SRS}/\Lambda\rfloor+\beta\lfloor n_{SRS}/K\rfloor)$ mod Λ, where K is a positive integer; and
send, during the $n_{SRS}{}^{th}$ transmission, the SRS through antenna ports comprised in the selected antenna group.

6. The terminal device according to claim 5, wherein the positive integer K is a quantity of SRS transmission sub-bandwidths comprised in a frequency hopping bandwidth for the SRS, and wherein the antenna group of the Λ antenna groups is further selected based on the K SRS transmission sub-bandwidths, such that an antenna group for sending the SRS for the $(n_{SRS}+iK)^{th}$ time is different from an antenna group for sending the SRS for the $(n_{SRS}+(i-1)K)^{th}$ time or the antenna group for sending the SRS for the $(n_{SRS}+iK)^{th}$ time is different from an antenna group for sending the SRS for the time $(n_{SRS}+(i+1)K)^{th}$, wherein 1≤i≤(Λ−2).

7. The terminal device according to claim 5, wherein the antenna group is further selected such that the antenna group for sending the SRS for the $n_{SRS}{}^{th}$ time is different from an antenna group for sending the SRS for the $(n_{SRS}+\Lambda)^{th}$ time.

8. The terminal device according to claim 5, wherein each of the Λ antenna groups comprises at least two different antenna ports, and the Λ antenna groups comprise all antenna ports of the terminal device.

9. A non-transitory computer readable storage medium, comprising computer program codes which when executed by at least one processor to cause a terminal device to perform operations comprising:
determining, by a terminal device, that a sounding reference signal (SRS) to be transmitted is an $n_{SRS}{}^{th}$ transmission of a plurality of SRS transmissions, wherein $n_{SRS}$ is a non-negative integer;
selecting, by a terminal device, an antenna group of Λ antenna groups to transmit the sounding reference signal (SRS) based on Λ and $n_{SRS}$, such that when sending the SRS for 2Λ times, the SRS is sent through each of the Λ antenna groups at least once, wherein Λ is a positive integer greater than or equal to 3, wherein the selected antenna group for transmitting the SRS for the $n_{SRS}{}^{th}$ time has an index number $\alpha(n_{SRS})$ determined based on:

$$a(n_{SRS}) = (n_{SRS} + \alpha\lfloor n_{SRS}/\Lambda\rfloor + \beta\lfloor n_{SRS}/K\rfloor) \mod \Lambda$$

wherein $$\alpha = \begin{cases} 1 & \text{when } K \text{ is an integer multiple of } \Lambda \\ 0 & \text{otherwise} \end{cases}, \text{ and}$$

$$\beta = \begin{cases} 1 & \text{when } K \text{ is an integer multiple of } \Lambda^2 \\ 0 & \text{otherwise} \end{cases};$$

and
$(n_{SRS}+\alpha\lfloor n_{SRS}/\Lambda\rfloor+\beta\lfloor n_{SRS}/K\rfloor)$ mod Λ represents a remainder obtained based on dividing $(n_{SRS}+\alpha\lfloor n_{SRS}/\Lambda\rfloor+\beta\lfloor n_{SRS}/K\rfloor)$ by Λ by Λ, where K is a positive integer; and
sending, by the terminal device during the $n_{SRS}{}^{th}$ transmission, the SRS through antenna ports comprised in the selected antenna group.

10. The non-transitory computer readable storage medium according to claim 9, wherein the positive integer K is a quantity of SRS transmission sub-bandwidths comprised in a frequency hopping bandwidth for the SRS, and wherein the antenna group of the Λ antenna groups is further selected based on the K SRS transmission sub-bandwidths, such that an antenna group for sending the SRS for the $(n_{SRS}+iK)^{th}$ time is different from an antenna group for sending the SRS for the $(n_{SRS}+(i-1)K)^{th}$ time or the antenna group for sending the SRS for the $(n_{SRS}+iK)^{th}$ time is different from an antenna group for sending the SRS for the $(n_{SRS}+(i+1)K)^{th}$ time, wherein 1≤i≤(Λ−2).

11. The non-transitory computer readable storage medium according to claim 9, wherein the antenna group is further selected such that the antenna group for sending the SRS for the $n_{SRS}{}^{th}$ time is different from an antenna group for sending the SRS for $(n_{SRS}+\Lambda)^{th}$ time.

12. The non-transitory computer readable storage medium according to claim 9, wherein each of the Λ antenna groups comprises at least two different antenna ports, and the Λ antenna groups comprise all antenna ports of the terminal device.

* * * * *

UNITED STATES PATENT AND TRADEMARK OFFICE
CERTIFICATE OF CORRECTION

PATENT NO. : 11,265,062 B2
APPLICATION NO. : 17/062139
DATED : March 1, 2022
INVENTOR(S) : Xiang Gao and Ruiqi Zhang It is certified that error appears in the above-identified patent and that said Letters Patent is hereby corrected as shown below:

In the Specification

In Column 1, Line 12, delete "entirely." and insert -- entirety. --.

In the Claims

In Column 22, Line 17, In Claim 1, after "is" insert -- an --.

In Column 22, Line 27, In Claim 1, delete "α($n_{SRS}$)" and insert -- a($n_{SRS}$) --.

In Column 22, Line 59, In Claim 2, delete "≤t≤(Λ–2)." and insert -- 1≤i≤(Λ–2). --.

In Column 22, Line 63, In Claim 3, delete "$n_{SRS}$+Λ)$^{th}$" and insert -- ($n_{SRS}$+Λ)$^{th}$ --.

In Column 23, Lines 13-14, In Claim 5, delete "Λ $n_{SRS}$, and" and insert -- Λ and $n_{SRS}$, --.

In Column 23, Line 19 (approx.), In Claim 5, delete "α($n_{SRS}$)" and insert -- a($n_{SRS}$) --.

In Column 23, Line 34, In Claim 5, delete "dividing($n_{SRS}$+" and insert -- dividing ($n_{SRS}$+ --.

In Column 23, Line 35, In Claim 5, delete "$K$⌋)mod" and insert -- $K$⌋) by --.

In Column 23, Line 48, In Claim 6, delete "time ($n_{SRS}$+(i+1)K)$^{th}$," and insert -- ($n_{SRS}$+(i+1)K)$^{th}$ time, --.

In Column 23, Line 48, In Claim 6, delete "1≤t≤(Λ–2)." and insert -- 1≤i≤(Λ–2). --.

In Column 24, Line 14, In Claim 9, delete "α($n_{SRS}$)" and insert -- a($n_{SRS}$) --.

Signed and Sealed this
Seventh Day of June, 2022

Katherine Kelly Vidal
*Director of the United States Patent and Trademark Office*

CERTIFICATE OF CORRECTION (continued)
U.S. Pat. No. 11,265,062 B2

In Column 24, Line 30 (approx.), In Claim 9, delete "Λ by A," and insert -- Λ, --.

In Column 24, Line 52 (approx.), In Claim 11, after "for" insert -- the --.